Sept. 18, 1956　　　R. E. BUCK ET AL　　　2,763,488
CHUCK WITH ADJUSTABLE TOOL BAR SUPPORT
Filed Oct. 8, 1954　　　　　　　　　　2 Sheets—Sheet 1
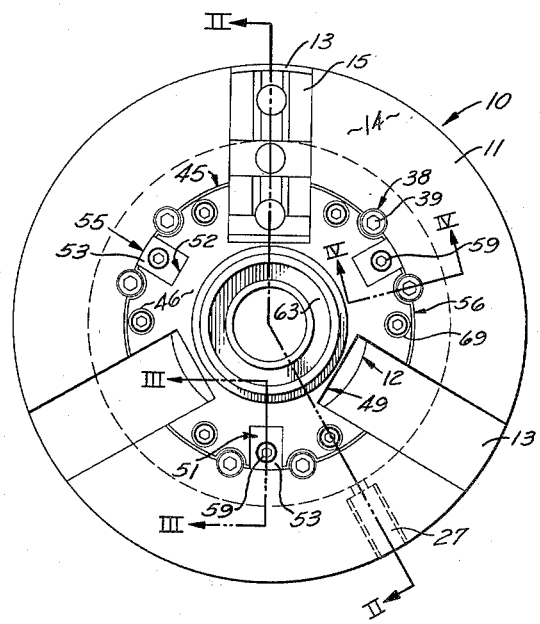
fig. 1
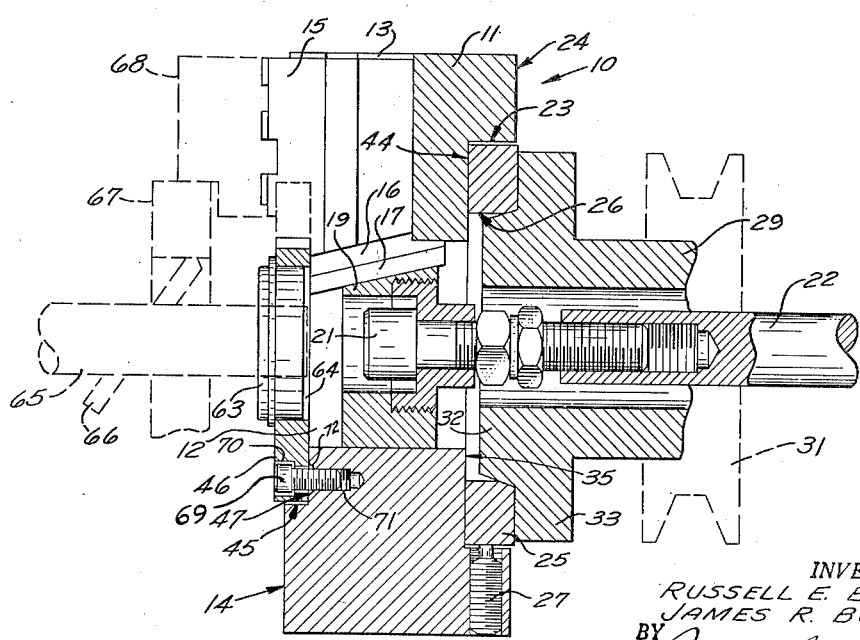
fig. 2
INVENTOR.
RUSSELL E. BUCK
JAMES R. BUCK
BY
Attorney

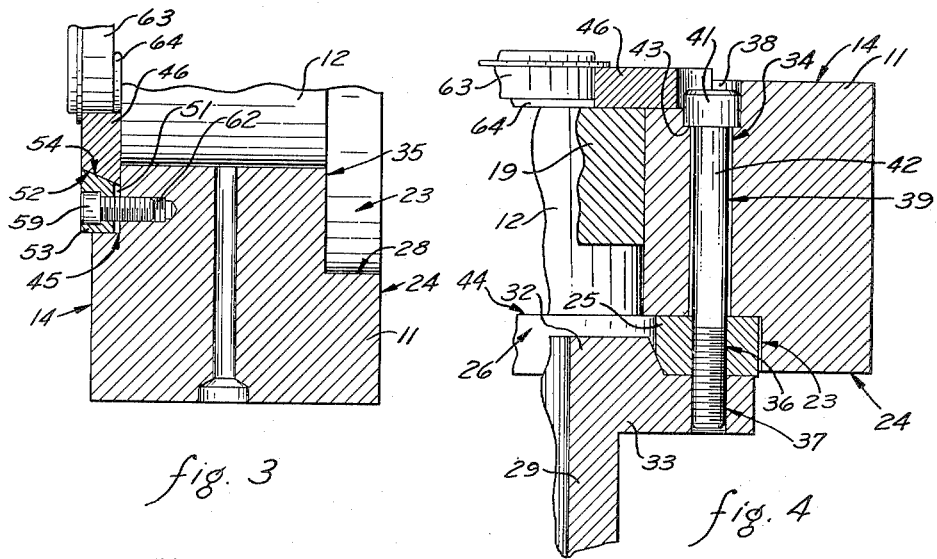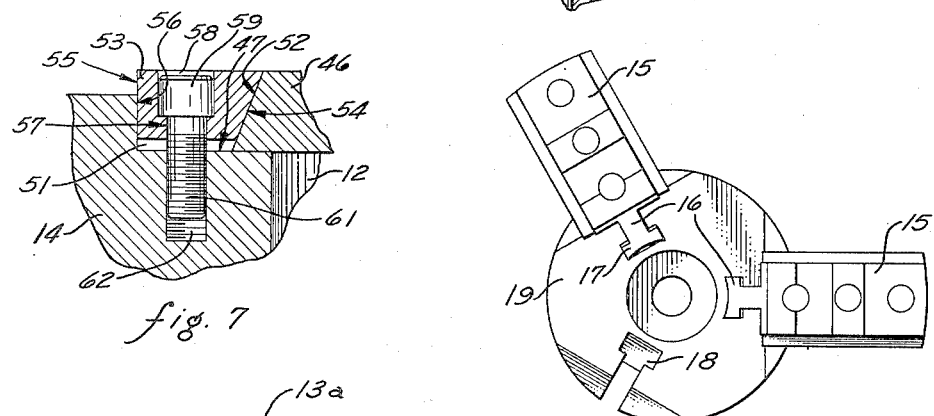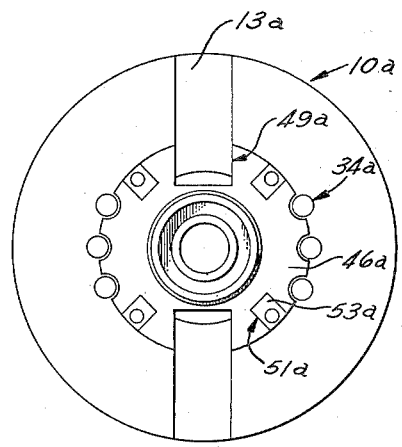
INVENTOR.
RUSSELL E. BUCK
JAMES R. BUCK
BY
Attorney

United States Patent Office 2,763,488
Patented Sept. 18, 1956

2,763,488

CHUCK WITH ADJUSTABLE TOOL BAR SUPPORT

Russell E. Buck, Scotts, and James R. Buck, Richland Township, Kalamazoo County, Mich., assignors to Buck Tool Company, Kalamazoo, Mich., a corporation of Michigan Application October 8, 1954, Serial No. 461,203

8 Claims. (Cl. 279—6)

This invention relates in general to a universal chuck having a tool bar support on the jaw face thereof, and more particularly to mechanism on said chuck for centering said tool support with respect to both the jaws of said chuck and a spindle upon which said chuck is mounted.

The construction and operation of a universal chuck having a tool bar support or pilot plate for embracing and steadying the outer free end of a lathe tool bar are well known. As disclosed in Patent No. 2,639,157, issued to Russell E. Buck and James R. Buck, universal chucks can be provided with an adapter device for accurately and quickly centering the chuck jaws with respect to any particular jaw opening. However, insofar as we are aware, both the adapter device and tool bar pilot plate cannot be used simultaneously on the same chuck according to existing practices. Adjustment of the adapter to place the chuck jaws in concentricity with the lathe spindle throws the chuck body, hence the pilot plate, out of concentricity. Thus, if the pilot plate must be used, the adapter cannot be and vice versa.

Accordingly, the primary object of this invention has been the provision of a mechanism whereby a tool bar support or pilot plate, provided on the jaw face of a universal chuck equipped with an independent, jaw centering device, can be accurately and quickly centered with respect to the spindle supporting the chuck, hence with respect to the chuck jaws.

A further object of this invention is the provision of a centering mechanism for a tool bar support, as aforesaid, which can be adapted for use with any universal chuck, such as a power chuck, presently provided with a tool bar support.

A further object of this invention is the provision of a centering mechanism, as aforesaid, which is simple to operate, inexpensive to manufacture, and which can be operated easily by persons capable of operating any type of lathe equipment requiring a chuck equipped with a tool bar support.

Other objects and purposes of this invention will become apparent to persons familiar with this type of equipment upon reading the following specification and examining the accompanying drawings in which:

Figure 1 is a front elevation view of a universal chuck embodying our invention.

Figure 2 is a sectional view substantially as taken along the line II—II of Figure 1.

Figure 3 is a sectional view taken along the line III—III of Figure 1.

Figure 4 is a sectional view taken along the line IV—IV of Figure 1.

Figure 5 is a front elevation of the wedge member shown in Figure 2 and a pair of jaws associated therewith.

Figure 6 is a front elevation view of a chuck showing a modified form of the invention.

Figure 7 is an enlarged fragment of Figure 3 rotated 90 degrees clockwise.

In meeting the objects and purposes set forth above, as well as others related thereto, we have provided a circular recess in the jaw face of a universal chuck 10 and a circular plate loosely receivable into said recess, said plate having a co-axial, cylindrical opening therethrough. Mechanism is provided for adjusting the said plate radially with respect to the peripheral wall of said recess.

For convenience in description the terms "front," "rear" and derivatives thereof will have reference to the leftward and rightward axial ends, respectively, of the chuck and parts associated therewith as appearing in Figure 2. The terms "inner," "outer" and derivatives thereof will have reference to the geometric center of said chuck and parts associated therewith.

*Detailed construction*

As shown in Figures 1 and 2, the universal chuck 10 has a cylindrical body 11 with a cylindrical, co-axial bore 12 therethrough. Said chuck may be, and for illustrative purposes here is, of the type generally referred to as a power chuck whose jaws are actuated by fluid pressure. The chuck body 11 is provided with a plurality of radially disposed jaw slots 13 in its jaw or leftward axial face 14, as appearing in Figure 2, which slots are preferably spaced equi-distantly from each other about said jaw face and communicate with said bore 12. A master or inner jaw 15 is radially, slidably disposed within each of said jaw slots 13 in a substantially conventional manner.

The radially inner end of each master jaw 15 is provided with a T-shaped tongue 16 (Figures 2 and 5) having flanges 17 converging with the axis of the chuck 10 on the jaw face side thereof. Each T-shaped tongue is slidably disposable with a corresponding, T-shaped slot 18 (Figure 5) in the periphery of the substantially cylindrical wedge member 19 which is axially, slidably disposed in the body bore 12. Said T-shaped slots 18 cooperate with the T-shaped tongues 16 on the master jaws 15 to effect radial movement of said jaws with respect to said chuck in response to axial movement of the wedge member 19 in a known manner. Said wedge member is secured, as by the stud 21, to a co-axial draw bar 22, which draw bar is axially reciprocated by means, such as a fluid actuated pressure cylinder, not shown.

A cylindrical, co-axial adapter recess 23 (Figures 2 and 4), which is a counterbore to the bore 12, is provided in the rear or rightward axial face 24 of the chuck body 11 for loose reception of an adapter ring 25 having a coaxial opening 26 therethrough. Said ring 25 is held within said recess 23 for radial adjustment with respect to the radial wall 28 (Figure 3) of said recess by means of a plurality of adjustment screws 27 radially disposed within the chuck body 11 and extendable into the recess 23 through the radial wall 28 thereof. The axes of said screws 27 preferably define a plane perpendicular to the axis of the chuck 10.

The chuck 10 may be mounted upon, and rotated by, a hollow spindle 29 which encircles the draw bar 22 and is driven by any convenient, conventional means, such as means including the pulley 31. The spindle 29 has a cylindrical, or conical, end portion 32 snugly receivable into the adapter ring opening 26, and an annular flange 33 adjacent to said end portion.

A plurality of parallel, cylindrical, smooth-bore openings 34 (Figure 4) are provided in the chuck body 11 equidistant from, and parallel with, the chuck body axis, which openings extend through the inner wall 35 of the recess 23. A plurality of threaded openings 36 and 37, preferably of lesser diameter than the smooth-bore openings 34 in the body 11, are provided in the adapter ring 25 and spindle flange 33 for co-axial alignment with each of said openings 34. The front or leftward ends of the openings 34 are provided with portions 38 of enlarged diameter. A plurality of support bolts 39 having heads 41 and threaded shanks 42 are slidably and relatively loosely received through the smooth-bore opening 34 and threadedly engaged by the threaded openings 36 and 37 in the spindle flange 25. The adapter ring 25 is held against the recess inner wall 35 as a result of the bolt heads 41 bearing against the shoulders 43 provided in the openings 34 by the portions 38 of enlarged diameter. Thus, the shanks 42 of the support bolts 39 will be flexed within their oversized openings 34 as the inner face 44 of the adapter ring 25 is slidably moved across the recess inner wall 35 by the adjustment screws 27.

As shown in Figures 1, 2 and 3, the jaw face 14 of the body 11 is provided with a co-axial, cylindrical pilot recess 45, which is also a counterbore of the bore 12, into which a circular pilot plate 46 of somewhat smaller diameter than said recess 45 is loosely received. The distance between the inner axial wall 47 of the pilot recess 45 and the opposing surface of the spindle end portion 32 is preferably sufficient to place said parts beyond the axial limits of movement of the wedge member 19 when disposed within the body bore 12 to prevent interference therebetween. As shown in Figures 1 and 2, the pilot plate 46 has notches 49 for slidably receiving the radially inner ends of the master jaws 15 therewithin, said notches being alignable with the jaw slots 13. The plate 46 is held in place within the recess 45 and against the face 47 thereof by the bolts 69 (Figures 2 and 3) extending through oversize openings 70 in plate 46 and threadedly received into the tapped openings 71 in the chuck body 11. The openings 70 are of sufficiently larger diameter throughout, as compared to the bolts 69 including the head portion thereof to permit the radial movement of the plate 46 with respect to the chuck body 11 as hereinafter mentioned. The openings 71 are provided with a limited countersink 72 for, in part, the same purpose.

The pilot plate 46 for a chuck 10 having three chuck jaws 15 is provided with three adjustment notches 51, which are radially disposed along the periphery of the pilot plate 46 intermediate the jaw notches 49. As shown in Figure 3, the radially inner wall 52 of each jaw notch 51 is sloped to converge with the axis of said pilot plate 46 on the front, outer side thereof. A plurality of adjustment blocks 53 are slidably and snugly receivable into said adjustment notches 51 (Figures 1, 3 and 7), and are provided with sloped end walls 54 having the same slope as, and being snugly and slidably engagable with, the sloped inner walls 52 of the notches 51. The opposite end walls 55 of the adjustment blocks 53 are arcuate on about the same radius as the periphery of the pilot plate 46 for snugly and slidably engaging the peripheral wall 56 of the pilot recess 45. The shortest radial distance between the outermost edge of the sloped inner wall 52 of the adjustment notch 51 and the peripheral wall 56 of the recess 45 is slightly less than the minimum distance between the end walls 54 and 55 of the adjustment blocks 53. This permits a wedging effect, as appearing in Figure 3, for effecting radial adjustment of the pilot plate 46 within, and with respect to, the peripheral wall 56 of the pilot recess 45.

Each of said adjustment blocks 53 (Figures 3 and 7) is provided with a bolt opening 57 whose axis is parallel with the axis of the plate 46 when the blocks 53 are properly disposed in the notches 51. Each of said bolt openings 57 is provided with a portion 58 of an enlarged diameter at its front end for slidably receiving the head 59 of an adjustment bolt 61 whose shank is threadedly received into a threaded opening 62 in the chuck body 11, each of said openings 62 being here positioned, but only as a matter of convenience, the same radial distance from the axis of the chuck body 11 as the openings 71. Thus, axial movement of the adjustment bolt 61 by appropriate rotation thereof in the threaded opening 62 will effect or permit a corresponding movement of the adjustment block 53 with respect to the chuck body 11 which, operating through the engaged, sloped faces of the block 53 and the notch 51, will effect a radial adjustment of the pilot plate 46 within the pilot recess 45.

A pilot bearing 63 (Figure 2) may be snugly received into, and held within, the co-axial cylindrical, pilot opening 64 through the pilot plate 46, for engaging and rotatably supporting the outer, free end of a tool bar 65. As shown in broken lines in Figure 2, the tool bar 65 may be of the conventional type having a tool bit 66 disposed therein for cutting a work piece 67 held in the outer jaws 68 of the chuck 10. Alternatively, the bearing 63 may be omitted and the free end of said tool bar 65 received directly into the opening 64 in the pilot plate 46 for rotational support thereby.

Figure 6 illustrates a chuck 10a having two, diametrically opposed, chuck jaw slots 13a in combination with a modified pilot plate 46a having two, diametrically opposed jaw notches 49a cooperating therewith. In the pilot plate 46a, a re-location of the adjustment notches 51a and the smooth-bore openings 34a is required. It will be observed that the adjustment notches 51a are preferably disposed equi-distantly about the periphery of the pilot plate 46a as in the case of the adjustment notches 51. The adjustment blocks 53a may be identical with the adjustment blocks 53 disclosed above with respect to the pilot plate 46.

*Operation*

In preparation for operation, the chuck 10 is assembled with the pilot plate 46 in the pilot recess 45, and with the master jaws 15 and outer jaws 68 mounted on the chuck body 11 and connected to the wedge member 19, as appearing in Figures 2 and 5. The chuck 10 is then mounted upon the end portion 32 of the spindle 29 with the adapter ring 25 disposed between the body 11 and the spindle flange 33 in this particular embodiment. Where used, the pilot bearing 63 is inserted into the pilot opening 64 in the pilot plate 46. The outer jaws 68, which grip the work piece 67, are centered on the spindle 29 by means of the adjustment screws 27 which engage, and radially adjust, the adapter ring 25 with respect to the radial wall 28 of the adapter recess 23. Further details regarding the adjustment of the chuck body 11 with respect to the spindle 29 through the adapter ring 25 and parts associated therewith can be found in our Patent No. 2,639,157 and reference is made thereto.

Centering of the jaws 68 with respect to the spindle 29 by a radial movement of the chuck body 11 with respect to said spindle also results in moving the center of the pilot plate 46 out of concentricity with the spindle 29. Therefore, the center of the pilot plate 46 must be adjusted for concentricity with the spindle 29, hence the tool bar 65, by proper axial movement of the adjustment bolts 61 with respect to the chuck body 11 into which they are threadedly received (Figures 3 and 7). Adjustment of said bolts 61 will, operating through the engaged, sloped end walls 52 and 54 of the adjustment notches 51 and adjustment blocks 53, respectively, effect a radial adjustment of the pilot plate 46 with respect to the peripheral wall 56 of the pilot recess 45. Accordingly, by adjustment of the adjustment bolts 61, the bearing 63, or the pilot opening 64 into which it is received, is accurately and quickly moved into concentricity both with the outer jaws 68 and the spindle 29.

Operation of the alternate chuck 10a, disclosed in Figure 6, will not vary materially from that described hereinabove with respect to the chuck 10 except that the adjustment will be effected by movement of four adjustment blocks 53a instead of the three adjustment blocks 53 shown in Figure 1. It will be observed that the pilot plate 46, or pilot plate 46a, is provided with adequate clearance to permit its radial adjustment with respect to the peripheral wall 56 of the recess 45 and other means such as the heads 41 of the support bolts 39. It will also be noted that the pilot recess is only deep enough to permit the adjustable disposition of the pilot plate 46 therewithin without interfering with the wedge member 19 into its forward position shown in in Figure 4. Obviously, these and other details, which are relatively immaterial, can be altered or modified as desired or required.

Although particular, preferred embodiments of our invention have been described and disclosed hereinabove for illustrative purposes, it will be understood that modifications or alterations thereof which lie within the scope of such invention are fully contemplated by the appended claims unless specifically stated to the contrary.

We claim:

1. In a universal chuck having a pilot bearing and means for centering the chuck jaws with respect to a lathe spindle, mechanism for centering said bearing with respect to said spindle comprising: means providing a circular, co-axial recess in the jaw face of said chuck; a circular cover plate of less diameter than, and loosely disposed in, said recess, said plate having a co-axial, circular opening and said bearing being within said opening; a plurality of spaced notches in the periphery of said plate, each notch having a radially inner wall sloped toward the axis of said plate away from said chuck; a plurality of adjustment blocks, one block disposed in each notch; and means for independently wedging each of said blocks between said inner wall and the radial wall of said recess.

2. In a universal chuck having a pilot bearing and means for centering the chuck jaws with respect to a lathe spindle, mechanism for centering said bearing with respect to said spindle comprising: means providing a circular, co-axial recess in the jaw face of said chuck; a circular cover plate of less diameter than, and loosely disposed in, said recess, said plate having a co-axial, circular opening and said bearing being within said opening; a plurality of notches disposed equi-distantly about the periphery of said plate, each notch having a pair of parallel side walls on opposite sides of, and equi-distant from, a radius of said plate, and each notch having a sloped inner wall converging with the axis of said plate away from said chuck; a plurality of adjustment blocks, one block being slidably within each of said notches, and each block having one end wall parallel with, and engageable by, said inner wall when its other end wall is flush with the radial wall of said recess; and means for independently urging said blocks toward said chuck.

3. In a universal chuck having a tool bar pilot bearing, mechanism for centering said bearing and the jaws of said chuck with respect to a lathe spindle, the combination comprising: a circular cover plate on the jaw end face of said chuck, said bearing being concentrically supported upon said plate; means for adjusting said plate radially of said chuck; a concentric, annular recess in the other end face; a ring of less diameter than said recess and disposed therein; means for adjusting said ring radially of said chuck; and means securing said ring rigidly with respect to said spindle and radially movably with respect to said chuck.

4. In a universal chuck having a tool bar pilot bearing, mechanism for centering said bearing and the jaws of said chuck with respect to a spindle, the combination comprising: a pair of concentric, annular recesses in the axial end faces of said chuck; a circular plate of less diameter than the recess in the jaw end face, said bearing being concentrically supported upon said plate; means for adjusting said plate radially of said chuck; a concentric, annular recess in the other end face; a ring of less diameter than said recess and disposed therein; means for adjusting said ring radially of said chuck; and means securing said ring rigidly with respect to said spindle and radially movably with respect to said chuck.

5. In a universal chuck having a tool bar pilot bearing, mechanism for centering said bearing and the jaws of said chuck with respect to a flanged lathe spindle, the combination comprising: a circular plate on the jaw end face of said chuck, said bearing being concentrically supported upon said plate; means for adjusting said plate radially of said chuck; a concentric, annular recess in the other end face; a ring of less diameter than said recess and disposed therein; means for adjusting said ring radially of said chuck; a plurality of smooth-bore openings in said chuck parallel with the axis thereof and corresponding, co-axial, threaded openings in said ring and flange; and a plurality of bolts of less diameter than said smooth-bore opening, one receivable in each smooth-bore opening and threadedly engageable with said corresponding threaded openings.

6. In a universal chuck for use with a spindle, means for centering a tool supporting bar with respect to said spindle comprising: a plate secured to the jaw face of said chuck, said plate having an opening therein for receiving and supporting said tool supporting bar, means supporting said plate for movement radially of said jaw face.

7. In a universal chuck having means for centering the chuck jaws with respect to a spindle, mechanism for centering a tool supporting bar with respect to said spindle comprising: means providing a co-axial recess in the jaw face of said chuck; a cover plate whose dimensions are less than the corresponding dimensions of said recess loosely disposed in said recess; said plate having an opening for receiving and supporting said tool supporting bar, means contacting the periphery of said plate at spaced intervals therealong for changing the position of said plate within said recess.

8. In a universal chuck for use with a spindle and a tool supporting bar, the combination comprising: a cover plate on the jaw end face of said chuck, said cover plate receiving and supporting said tool supporting bar; means for adjusting said plate radially of said chuck; a circular recess in the other end face of said chuck, spindle means of less diameter than said recess disposed therewithin and means for adjusting the spindle means radially of said chuck.

References Cited in the file of this patent

UNITED STATES PATENTS

| | | |
|---|---|---|
| 2,513,606 | Wahnish | July 4, 1950 |
| 2,524,468 | Quimette | Oct. 3, 1950 |
| 2,567,498 | Strauss | Sept. 11, 1951 |
| 2,597,280 | Barnes | May 20, 1952 |

FOREIGN PATENTS

| | | |
|---|---|---|
| 265,049 | Great Britain | Feb. 3, 1927 |